Patented July 15, 1941

2,248,966

UNITED STATES PATENT OFFICE 2,248,966

DRYING COMPOSITION

Frank W. Corkery, Crafton, Pa., assignor to Falk & Company, a corporation of Pennsylvania No Drawing. Application December 11, 1940, Serial No. 369,551

4 Claims. (Cl. 260—23)

This invention relates to the production of a quick-drying oleoresinous composition suitable for use as a vehicle, or base, in coating compositions; and the application hereof is a continuation-in-part of my co-pending applications Serial No. 195,345, filed March 11, 1938, and Serial No. 219,188, filed July 14, 1938.

Oxidizable oils, known generically as drying oils, comprise oils containing such content of unsaturated fatty acid glycerides that they dry with relatively great rapidity when spread to present an extended surface to atmospheric oxygen, and are usually termed "drying" oils; and other oils which contain a much lower content of the unsaturates susceptible to oxidation are known specifically as "semi-drying" oils. Oils of this latter sort, typically represented by fish oil, soya bean oil and sunflower seed oil, dry so slowly when spread in a film that their deficiency in this regard may be taken as the quality chiefly responsible for limitation in the volume of these oils used in coating compositions.

In my co-pending application Serial No. 195,345, filed March 11, 1938, I have particularly disclosed the employment of my process upon the oils having such relatively low content of the glycerides of unsaturated fatty acids that they are known as semi-drying oils. While my procedure, by effecting preoxidation of semi-drying oils to an extent not approached by previous practice, is particularly valuable with respect to those oils, it is also a fact, as disclosed in my application Serial No. 219,188, filed July 14, 1938 that by practicing it while using full drying oils, such as linseed oil and perilla oil, as the starting material, I am able greatly to improve the drying qualities and the film-forming characteristics of those oils. Thus by treating linseed oil by my method, I am able to produce a linseed oil of novel drying and film-forming characteristics, while perilla oil, when used as a starting material, gives a product of the most superior sort. Primarily considered, my invention, herein disclosed, consists in carrying a straight oxidation of drying oil, such as linseed oil or perilla oil, approximately as far as may be done without causing the oil bodily to gel into a substantially infusible state; then adding a suitable resinous substance having mutual solubility with the oil, and capable of dispersing the gel structure which has been up to that stage formed in the oil; and then subjecting this oil dispersion to substantial additional straight oxidation. The results thus obtained are not comparable to those obtained merely by conducting oxidation of the oil to a normally permissible stage, nor to those obtained by conducting the entire oxidizing operation in the presence of an oil-soluble substance having a general capacity to disperse the oil.

In conducting my process, I treat an oil of initially good drying qualities in a treating vessel by blowing air in relatively high volume and dispersion through the oil, while heating the oil to a temperature suitable for facilitating the dispersion of air in it. This blowing is continued under carefully controlled conditions, to a point at which bodily gelation of the oil is imminent, the batch being checked from time to time so that warning of such imminent gelation may be had. At this stage I add to the batch in large proportion an oil-soluble resin, or mixture of oil-soluble resins, thermoplastic in nature. When the previously formed gel structure in the oil has been dispersed by being throughly commingled in the resin, and while maintaining the temperature of the batch, blowing is further conducted until the maximum oxidation of the oil has been effected. In order to obtain the best results of my process the resins should be added in relatively great proportions, and should be added at a stage when the oil has been oxidized to the maximum extent possible without bodily gelation into an infusible and insoluble condition. The following may be taken as exemplary of practice under my invention:

Example No. 1

A 1000 pound batch of raw linseed oil was put into a blowing vessel, and was heated to within the approximate temperature range of 170° F. to 200° F. Air was blown through the linseed oil under pressure and in a volume and distribution adequate to constitute a moderate blowing practice considered in relation to the volume of the oil. Specifically I blew at a rate of about 1 to 1.5 cubic feet of air per hour per pound of oil. The initial viscosity of the oil was approximately 100 Saybolt seconds at 210° F., and at the end of about 4.5 days had been raised to between 2500 and 3000 Saybolt seconds. Continued blowing of a drying oil, such as linseed oil, proceeds so rapidly after a viscosity of 3000 has been reached that the danger of bodily gelation in the oil makes it inadvisable further to uninterruptedly continue a straight oxidizing operation.

At this stage of the oxidation treatment, gelation being imminent, I quickly added 500 pounds of coumarone-indene resin, desirably pre-melted and at a temperature of about 190° F. The resin had a melting point of about 135° F. (ball and ring method).

After addition of the resin, oxidation was continued under the same blowing conditions, and the melting point of cooled samples of the batch was used to observe the continuance of oxidation. After an additional blowing treatment for about 25 hours, further blowing did not further raise the melting point of the batch, and the treatment was considered to have been carried to a maximum.

The product of the treatment was an oleoresinous material, having a melting point of about 130° F., and an iodine value of about 90 as compared with an initial iodine value of about 180 for the raw linseed oil. It was soluble in both the aromatic and aliphatic hydrocarbon solvents, to provide a coating composition. The composition when spread to expose an extended surface dried completely in about six hours to a hard glossy film.

*Example No. 2*

A 1000 pound batch of perilla oil was put into a blowing tank, and was heated to within the approximate temperature range of 170° F. to 200° F. Air was blown through the oil under pressure, and at a rate of about 1 to 1.5 cubic feet of air per hour per pound of oil. After about 3.5 days of blowing, the viscosity of the oil had been increased from an initial viscosity of 100 Saybolt seconds at 210° F. to a viscosity between 2500 and 3000 Saybolt seconds. Soon after observation of such viscosity the oil passed with difficulty through the orifice of the Saybolt Furol viscosimeter, and it became apparent that a bodily gelation of the oil was imminent.

At this stage of the oxidizing treatment immediately preceding gelation, I added 400 pounds of ester gum having a melting point of about 85° C. with the oil. Oxidation was continued under the same blowing conditions as previously employed up to a point at which the mixture, when removed from the blowing vessel and cooled, was found to have acquired a melting point of about 90° F. At this stage, which was reached after blowing had been resumed and continued for about 12 hours, no further increase in melting point resulted from a continuance of the blowing, thus indicating that maximum preoxidation had been effected.

The perilla oil had an iodine value of about 180 and the oleoresinous product an iodine value of about 125. The product was soluble in both the aromatic and aliphatic hydrocarbon solvents, to provide a coating composition. The oleoresinous mateiral when applied in a solvent to present an extended surface to the atmosphere dries completely in about three hours to a hard, particularly glossy, film resembling closely the film formed by the air drying of a film of China-wood oil—ester gum varnish.

*Example No. 3*

A batch composed of 1400 pounds of linseed oil and 600 pounds of perilla oil was put into a blowing vessel and heated to within the approximate temperature range of 170° F. to 200° F. Air was blown through the oil under pressure, and at a rate of about 1 to 1.5 cubic feet of air per hour per pound of oil. After about 4 days of blowing, the viscosity of the oil had been increased from an initial viscosity from 100 Saybolt seconds at 210° F. to a viscosity between about 2500 and 3000 Saybolt seconds. Soon after observation of such viscosity the oil passed with difficulty through the orifice of the Saybolt Furol viscosimeter, and it became apparent that a bodily gelation of the oil was imminent.

At this stage of the oxidizing treatment immediately preceding gelation, I mixed about 850 pounds of rosin with the oil. Oxidation was continued under the same blowing conditions as previously employed up to a point at which the mixture, when removed from the blowing vessel and cooled, was found to have acquired a melting point of about 90° F. At this stage, which was reached after blowing had been resumed and continued for about 12 hours, no further increase in its melting point resulted from a continuance of the blowing, thus indicating that maximum preoxidation had been effected.

It may here be noted that an addition of rosin, and this is in measure true of ester gum, exerts on the gel structure produced in the first stage of the process a higher dispersive effect than does an equal proportional addition of coumarone-indene resin.

The mixed oxidizable oil had an iodine value of about 195 and the oleoresinous product an iodine value of about 140. The product was soluble in both the aromatic and aliphatic hydrocarbon solvents, to provide a coating composition. The oleoresinous material when applied in a solvent to present an extended surface to the atmosphere dries completely in about 5 hours to a hard, particularly glossy, film resembling closely the film formed by the air drying of a Chinawood oil—ester gum varnish film.

My treatment of the drying oils having relatively poor drying properties, and which are known popularly as "semi-drying" oils, is approximately identical with my treatment of oils having initially good drying properties, such as linseed oil and perilla oil. These "semi-drying" oils include fish oil, menhaden oil, sardine oil, pilchard oil, sunflower seed oil, soya bean oil, safflower oil, hempseed oil, poppy seed oil, walnut oil, and rape seed oil, together with less common oils of similar sort. When spread in a film under test conditions, all these oils dry slowly, and all except safflower oil require from 25 to 60 hours for air-drying, in their untreated condition. As untreated, none of these oils air-dry in any length of time in a manner to give a hard film, but on the contary all give a film which, even when air dried to a maximum, is still soft, tacky, or cheesy.

*Example No. 4*

A 1000 pound batch of pressed fish oil was put into a blowing tank, and was heated to within the temperature range of 170° F. to 200° F. Air was blown through the fish oil under pressure and in a volume and distribution adequate to constitute a moderate blowing practice considered in relation to the volume of the oil. Specifically I blew at the rate of about 1 to 1.5 cubic feet of air per hour per pound of oil. The initial viscosity of the oil was approximately 100 Saybolt seconds (Saybolt Furol viscosimeter) at 210° F., and at the end of 5.5 days had been raised to between 2000 and 3000 Saybolt seconds.

From this stage the viscosity rise was rapid, and I checked the viscosity at frequent intervals to be sure that it did not rise beyond the point of safe procedure. When the viscosity of the batch approached 5000 Saybolt seconds at 210° F., I added to the batch 500 pounds of coumaroneindene resin of 90° C. melting point, pre-melted and at a temperature of about 250° F.

After addition of the resin, oxidation was continued under the same blowing conditions, and the melting point of cooled samples was used to observe the continuance of oxidation. After additional blowing treatment for about 1.5 days, the melting point of the composition had been raised between 5 and 6 degrees C., and further tests showed that a continuance of oxidation did not result in any further increase in melting point. This indicated that maximum preoxidation had been effected.

The solid material produced by this treatment was found to be soluble in both the aromatic and aliphatic hydrocarbon solvents, to provide a coating composition. The composition when spread to expose an extended surface to the atmosphere, dries completely in about nine hours to a hard film, wholly without tackiness.

*Example No. 5*

A 1000 pound batch of pressed fish oil was put into a blowing tank, and was heated to within the temperature range of 170° F. to 200° F. Air was blown through the fish oil under pressure, and at a rate of about 1 to 1.5 cubic feet of air per hour per pound of oil. After about 5.5 days of blowing, the viscosity of the oil had been increased from an initial viscosity of 100 Saybolt seconds at 210° F. (Saybolt Furol viscosimeter) to a viscosity similarly checked, of about 3600 Saybolt seconds. Soon after observation of such viscosity the oil passed with difficulty through the orifice of the viscosimeter, and it became apparent that a bodily gelation of the oil was imminent.

At the stage of oxidizing treatment immediately preceding gelation, I mixed 400 pounds of ester gum with the oil. Oxidation was continued under the same blowing conditions as previously employed up to a point at which the mixture had acquired a melting point of about 96° F., and further blowing did not result in any increase in melting point, thus indicating that maximum preoxidation had been effected.

The fish oil treated had an initial iodine value of about 180 and at the stage of resin addition had an iodine value of about 80. When the fish oil was blended raw with ester gum in equal proportions by weight, the oleoresinous material dried in about 12 hours to give a definitely tacky film. The oleoresinous mixture produced by my method dried in 7 hours to a hard film.

*Example No. 6*

A batch of 1000 pounds of soya bean oil was placed in a blowing tank, and was heated to within the temperature range of 170° F. to 200° F. Air was blown through the soya bean oil under pressure, and at a rate of 1 to 1.5 cubic feet of air per hour per pound of oil. After about 5.5 days of blowing, the viscosity of the oil was raised from an initial viscosity of 100 Saybolt seconds at 210° F. (Saybolt Furol viscosimeter) to a viscosity, similarly checked, in excess of 3000 Saybolt seconds. Soon after observation of a viscosity of 3000, the oil passed with difficulty through the orifice of the viscosimeter, and it became apparent that a bodily gelation of the oil was imminent.

At this stage of the oxidizing treatment, immediately preceding gelation, I mixed 400 pounds of ester gum with the oil. Oxidation was continued under the same blowing conditions as previously employed up to a point at which the mixture had acquired a melting point of about 84° F., further blowing did not result in any increase in melting point, thus indicating that maximum preoxidation had been effected.

The soya bean oil treated had an initial iodine value of about 130, and at the stage of resin addition had an iodine value of about 85. When the soya bean oil was blended raw with ester gum in equal proportions by weight, the oleoresinous material did not dry in less than a week and was very tacky. The oleoresinous mixture produced by my method dried in 10 hours to a hard film.

It is not practical more definitely to define, by iodine number or viscosity, the stage of oxidation at which the resin should be added. This is for the reason that the various drying oils, both of the full drying and semi-drying sort vary widely from each other in their iodine value, and the initial rate at which they are oxidized in blowing. There is also variation in these items of performance between lots of semi-drying oils which are fundamentally of the same sort. It may be stated generally that for most drying oils of both classes the resin may effectively be added soon after the viscosity of the oil reaches 3000 Saybolt seconds at 210° F.

The theory as to why the addition of resin to the batch at an advanced stage of the process is effective to permit substantial further treatment of the oil will be explained later herein. I here note that the resin being freshly added at such stage, the resin should be added in a quantity adequate so to disperse the gel structure previously formed in the process that substantial further preoxidation may be effected without incurring the risk of premature gelation, which would prevent removal of the batch from the blowing vessel. If the maximum effect of the two stage blowing is to be obtained, the resin should be added in a proportion of about 25%, or more, the total weight of the batch after addition of the resin. While a somewhat lesser proportion of a resin very soluble in the oil is frequently adequate to hold back gelation enough to permit some further oxidation treatment after its addition, there is danger of premature gelation in so doing. I prefer, as in the examples, to leave some margin of safety over the absolute minimum of resin which will give the results contemplated in my process.

The time and temperature of the treatment are in a limited sense reciprocal conditions, the time of treatment being shortened with increased temperature of the treatment. It is, however, necessary that the temperature of the treatment be below a polymerizing temperature, because the establishment of polymerizing conditions definitely inhibits the progress of preoxidation in the oil. I have found that the maximum temperature which may be employed without establishing polymerizing conditions is within the approximate range of 250° F. to 350° F. The previous examples employ temperatures far below that maximum, and utilize relatively small quantities of resin to effect gel dispersion. In the following examples, which fundamentally parallel Examples 1 and 5, higher temperature is used, and the resin is added in greater proportion.

*Example No. 7*

A 1000 pound batch of raw linseed oil was put into a blowing vessel, and was heated to about 250° F. Air was blown through the linseed oil under pressure and at a rate of about 1 to 1.5 cubic feet of air per hour per pound of oil. The initial viscosity of the oil was approximately 100 Saybolt seconds at 210° F., and at the end of about 20 hours had been raised to between 2500 and 3000 Saybolt seconds. At this stage of the oxidation treatment, gelatin being imminent, I quickly added 1000 pounds of coumarone-indene resin, desirably pre-melted and at a temperature of about 190° F. The resin had a melting point of about 135° F. (ball and ring method). Immediately after addition of the resin, cooled samples of the batch showed a melting point of about 90° F.

After addition of the resin, oxidation was continued under the same blowing conditions, and the melting point of cooled samples of the batch was used to observe the continuance of oxidation. After an additional blowing treatment for about 5 hours, further blowing did not further raise the melting point of the batch, and the treatment was considered to have been carried to a maximum.

*Example No. 8*

A 1000 pound batch of pressed fish oil was put into a blowing tank, and was heated to about 300° F. Air was blown through the fish oil under pressure, and at a rate of about 1 to 1.5 cubic feet of air per hour per pound of oil. After about 20 hours of blowing, the viscosity of the oil had been increased from an initial viscosity of 100 Saybolt seconds at 210° F. (Saybolt Furol viscosimeter) to a viscosity, similarly checked, of about 3600 Saybolt seconds. Soon after observation of such viscosity the oil passed with difficulty through the orifice of the viscosimeter, and it became apparent that a bodily gelation of the oil was imminent.

At the stage of oxidizing treatment immediately preceding gelation, I mixed 1000 pounds of ester gum with the oil. When the oil had been thoroughly commingled in the resin, the mixed body was found to have a melting point of approximately 90° F. (ball and ring method). Oxidation was continued under the same blowing conditions as previously employed up to a stage, reached in about 5 hours, at which the mixture had acquired a melting point of about 96° F., and further blowing did not result in any increase in melting point, thus indicating that maximum preoxidation had been effected.

It should be explained that in order to obtain the full benefit from my process, the resin should be introduced to effect gel dispersion in the batch at as late a stage in the initial step of the treatment as is possible without incurring the risk of bodily gelation. A viscosity of 3000 Saybolt seconds at 210° F. may be taken roughly to indicate the danger point at which the resin must be quickly introduced in order to avoid gelation, and a point at which the gel-dispersing effect of the resin is adequate to permit a substantial further blowing, and thus carries the oil to a stage of oxidation at which the full benefit of the process is obtained.

An explanation of the remarkable improvement in drying qualities and film-forming characteristics obtained by practice in accordance with my method is to be found in the following theoretical discussion of the drying mechanism established by blowing oxidizable oils in accordance with the above-described procedure.

Raw linseed oil contains the glycerides of oleic acids, linoleic acids, and linolenic acids in such proportion that the glycerides of the unsaturated fatty acids represent approximately 72% of the oil, while saturated fatty acid glycerides (preponderantly olein) are approximately 28% of it.

Although these glycerides include relatively small proportions of stearin, palmitin, and palmitolein, olein so preponderates that the sum of these glycerides will hereinafter be referred to generically as "olein." When spread in a film, the oil dries by absorbing oxygen from the air, and gels are formed of the glycerides of the linoleic and linolenic acids, while the film is rendered continuous by the dispersing effect of the olein. Linseed oil is so balanced in its unsaturated and saturated constituents that in its raw condition the oil dries normally to a good coating.

Soya bean oil differs from linseed oil in that its content of olein is much greater than the olein content of linseed oil; thus when a film of raw soya bean oil is spread, and oxidation takes place, the dispersing effect of the olein on the gels formed by the oxidation of the unsaturated glycerides is so great that a very soft film is produced. When either linseed oil or soya bean oil is kettled, polymerization decreases the ability of its content of unsaturates to absorb oxygen, so that the drying time is lengthened. Polymerization in the oil has very little effect on the type of film produced, save that the increase in viscosity increases the levelling property of the oil. When either linseed or soya bean oil is blown in accordance with previous practice, the unsaturates are given an initial oxygen addition, the linkage being relatively weak, so that the blown oils, when spread in a film, dry slightly faster than corresponding raw oil, but the inherent film characteristics of the oil are not greatly affected.

The foregoing implicitly gives explanation as to why it is important to introduce the resin in fresh, unoxidized condition at a stage in the process in which preoxidation of the oil has proceeded approximately as far as is initially permissible—and then to effect further preoxidation in the batch. The moles of the thermoplastic oil-soluble resin when freshly introduced have solvency for the moles of the oxidized oil, and perform the function of unoxidized moles of the oil itself in dispersing them. If, the resin is added at the end of the oxidation treatment, it does no more than assure that the batch, in its condition at the time of the resin addition may successfully be removed from the blower. If the resin be added in an early stage of the treatment, the resin itself is oxidized into a condition in which it lacks solubility for the oil, and in which it is incapable of exerting an adequate dispersive effect in the oil at the very stage of the process (the point at which gelation becomes imminent) in which dispersion is necessary in order that preoxidation may proceed. But the fresh oil-soluble resin added at that stage of the process, being unaffected by the previous conditions of the process, is fully capable of performing its intended function.

It is to be understood that thermoplastic and oil-soluble synthetic resins, other than the specifically exemplified coumarone-indene resin, rosin, and ester gum may be used. Rosin-modified phthalate resins, oil-soluble aldehyde resins and their resin modifications, and the oil-soluble natural resins, such as run East India gum, run Kauri, Congo, and Manila gums are usable. It may be explained further that the "resin" included in the composition in accordance with my procedure may in fact be two or more of the individually suitable resins rather than a single resin, and it is possible, by including in the composition a mixture, or blend, of resins to obtain specific adaptation of the composition to particular uses.

Also, if so desired, the drying oil included in the composition may in fact be a mixture of two or more drying or semi-drying oils.

It is to be noted that "drying oils" as herein discussed have included linseed oil, perilla oil, and the less oxidizable drying oils popularly known as "semi-drying oils", but that China-wood oil has not been discussed nor exemplified. This is for the reason that China-wood oil, because of the intermolecular and intramolecular effects peculiar to it, cannot by itself be subjected to my process, and cannot be included in substantial proportion to make with the other drying oils a blended starting material. The linkages of China-wood oil are such as to render it so susceptible to polymerization that the most temperature conditions under which my preoxidation treatment might be conducted would cause it, or a blend in which it is included in substantial proportion, to be polymerized rather than oxidized. It has been noted that I carefully avoid polymerizing conditions in conducting my preoxidation treatment. Because of the abnormal activities of China-wood oil, it is justifiable to group all the other drying oils both of the full drying and semi-drying sort as normal drying oils, or drying oils less susceptible to polymerization than China-wood oil.

It should be explained that all the drying tests I use to give facts as to the time of drying, involve bringing the material back to the viscosity of raw oil by adding suitable solvent; adding lead and cobalt in oil-soluble form so that there is present, on the basis of the non-volatile oil content, 0.4 of 1% metallic lead and 0.03 of 1% metallic cobalt; and spreading the material in a thin film so that after drying the film thickness is between .001 and .003 of an inch. Drying is effected at about 77° F., and about 50% relative humidity.

I claim as my invention:

1. The herein described method of making quick drying coating compositions from oxidizable drying oils and resins by blowing air through an oil having drying qualities and which is less susceptible to polymerization than China-wood oil at an oxidizing temperature below that which would cause substantial polymerization in the oil, when by oxidation in the oil the production of large molar bodies therein tends to exceed the capacity of the inherent plasticising content of the oil to disperse them and bodily gelation of the oil becomes imminent, dispersing the gel structure composed of the said large molar bodies by making a plasticising addition of oil-soluble thermoplastic resin to the said body of oil, and after such gel dispersion continuing to blow air through the batch for a substantial blowing period to a stage at which the viscosity of the oil has been further increased without gelation of the oil.

2. The herein described method of making quick drying coating compositions from oxidizable drying oils and resins in accordance with the procedure of claim 1 in which the oil-soluble thermoplastic resin plasticising addition of which is made is coumarone-indene resin.

3. The herein described method of making quick drying coating compositions from oxidizable drying oils and resins by blowing air through an oil having drying qualities and which is less susceptible to polymerization than China-wood oil at an oxidizing temperature below that which would cause substantial polymerization in the oil, when by oxidation in the oil the production of large molar bodies therein tends to exceed the capacity of the inherent plasticising content of the oil to disperse them and bodily gelation of the oil becomes imminent, dispersing the gel structure composed of the said large molar bodies by making a plasticising addition of oil-soluble thermoplastic resin to the said body of oil in a quantity not substantially less than 25% the combined weight of the oil and added resin, and after such gel dispersion continuing to blow air through the batch for a substantial blowing period to a stage at which the viscosity of the oil has been further increased without gelation of the oil.

4. The herein described method of making quick drying coating compositions from oxidizable drying oils and resins in accordance with the procedure of claim 3 in which the oil-soluble thermoplastic resin plasticising addition of which is made is coumarone-indene resin.

FRANK W. CORKERY.

CERTIFICATE OF CORRECTION.

Patent No. 2,248,966.  July 15, 1941.

FRANK W. CORKERY.

It is hereby certified that error appears in the printed specification of the above numbered patent requiring correction as follows: Page 5, first column, line 16-17, for "temperature" read --temperate--; and that the said Letters Patent should be read with this correction therein that the same may conform to the record of the case in the Patent Office.

Signed and sealed this 23rd day of September, A. D. 1941.

(Seal)

Henry Van Arsdale,
Acting Commissioner of Patents.